(12) United States Patent
Sasaki et al.

(10) Patent No.: US 11,428,981 B2
(45) Date of Patent: Aug. 30, 2022

(54) LIQUID CRYSTAL DISPLAY PANEL

(71) Applicant: SHARP KABUSHIKI KAISHA, Sakai (JP)

(72) Inventors: Takahiro Sasaki, Sakai (JP); Hiroyuki Hakoi, Sakai (JP); Takashi Satoh, Sakai (JP); Junichi Hashimoto, Sakai (JP); Ming Ni, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/105,622

(22) Filed: Nov. 26, 2020

(65) Prior Publication Data
US 2021/0165274 A1    Jun. 3, 2021

(30) Foreign Application Priority Data

Nov. 29, 2019 (JP) .............................. JP2019-216777

(51) Int. Cl.
*G02F 1/1335*        (2006.01)
*G02F 1/13363*      (2006.01)
(Continued)

(52) U.S. Cl.
CPC ...... *G02F 1/133555* (2013.01); *G02F 1/1337* (2013.01); *G02F 1/1368* (2013.01);
(Continued)

(58) Field of Classification Search
CPC ......... G02F 1/133555; G02F 1/133504; G02F 1/13363; G02F 1/1368; G02F 1/1337; G02F 1/13712; G02F 1/133557
See application file for complete search history.

(56) References Cited

U.S. PATENT DOCUMENTS

2004/0114076 A1    1/2004   Liao et al.
2004/0075791 A1*  4/2004   Liu .................. G02F 1/133555
                                                              349/114
(Continued)

FOREIGN PATENT DOCUMENTS

JP       10325953 A   * 12/1998   ....... G02F 1/133555
JP       3394926 B2      4/2003
(Continued)

*Primary Examiner* — James A Dudek
(74) *Attorney, Agent, or Firm* — ScienBiziP, P.C.

(57) ABSTRACT

A liquid crystal display panel includes pixels including a reflective region for display in a reflection mode and a transmissive region for display in a transmission mode. The liquid crystal display panel includes a liquid crystal layer including a nematic liquid crystal material having negative dielectric anisotropy and a chiral agent, a pixel electrode including a reflective conductive layer and a transparent conductive layer, a counter electrode, a light diffusing structure provided in common to the reflective region and the transmissive region, and a first vertical alignment film provided between the pixel electrode and the liquid crystal layer, and a second vertical alignment film provided between the counter electrode and the liquid crystal layer. At least one of the first vertical alignment film and the second vertical alignment film has an alignment regulating force defining a pretilt azimuthal direction, and in a case where the thickness of the liquid crystal layer in the reflective region is dr, and the thickness of the liquid crystal layer in the transmissive region is dt, dr and dt are in a range of $0.85 \le dt/dr \le 1.25$.

23 Claims, 13 Drawing Sheets

(51) Int. Cl.
  *G02F 1/1368* (2006.01)
  *G02F 1/1337* (2006.01)
  *G02F 1/137* (2006.01)

(52) U.S. Cl.
  CPC .... *G02F 1/13363* (2013.01); *G02F 1/133504*
         (2013.01); *G02F 1/13712* (2021.01)

(56) References Cited

U.S. PATENT DOCUMENTS

| | | | |
|---|---|---|---|
| 2005/0083462 A1* | 4/2005 | Lin | G02F 1/133555 |
| | | | 349/114 |
| 2010/0295841 A1 | 11/2010 | Matsuda et al. | |
| 2013/0320334 A1 | 12/2013 | Yamazaki et al. | |
| 2016/0209694 A1 | 7/2016 | Inada et al. | |

FOREIGN PATENT DOCUMENTS

| | | |
|---|---|---|
| JP | 2004-199030 A | 7/2004 |
| JP | 5036864 B2 | 9/2012 |
| JP | 2014-007399 A | 1/2014 |
| JP | 2016-133803 A | 7/2016 |

\* cited by examiner

LIQUID CRYSTAL DISPLAY PANEL

CROSS-REFERENCE TO RELATED APPLICATIONS

This application claims the benefit of priority to Japanese Patent Application Number 2019-216777 filed on Nov. 29, 2019. The entire contents of the above-identified application are hereby incorporated by reference.

BACKGROUND

Technical Field

The present disclosure relates to a liquid crystal display panel, and particularly relates to a transflective liquid crystal display panel in which each pixel has a reflective region and a transmissive region.

A liquid crystal display panel in which each of pixels includes a reflective region for display in a reflection mode and a transmissive region for display in a transmission mode is referred to as a transflective or transmissive reflective liquid crystal display panel. A transflective liquid crystal display device including a transflective liquid crystal display panel and a backlight device can simultaneously perform or alternatively switch the display in a transmission mode using light emitted from the backlight device and the display in a reflection mode using peripheral light. A transflective liquid crystal display device is particularly suitably used as a medium or small display device for mobile applications used outside.

In the transflective liquid crystal display panel, a structure has been employed in which the thickness of a liquid crystal layer in the reflective region is smaller than the thickness of the liquid crystal layer in the transmissive region in order to improve the display quality of the reflection mode and the transmission mode (also referred to as a "multi-gap structure" or a "dual cell gap structure"). Herein, "cell gap" is used synonymously with "thickness of liquid crystal layer". The thickness of the liquid crystal layer in the reflective region is most preferably one-half of the thickness of the liquid crystal layer in the transmissive region. Light contributing to the display in the reflection mode passes through the liquid crystal layer twice, and therefore, by setting the thickness of the liquid crystal layer in the reflective region to be one-half of the thickness of the liquid crystal layer in the transmissive region, the retardations of the liquid crystal layer for both light for the display in the reflection mode and light for the display in the transmission mode match, and optimal voltage-luminance characteristics are obtained for both the reflective region and the transmissive region.

However, it is not easy to form regions being different from each other in thickness of the liquid crystal layer in each pixel. Thus, a transflective liquid crystal display panel having a "single cell gap structure", in which the thickness of the liquid crystal layer in the reflective region and the thickness of the liquid crystal layer in the transmissive region are the same has been proposed (for example, JP 2004-199030 A and JP 2016-133803 A).

For example, JP 2004-199030 A discloses a transflective liquid crystal display panel having a single cell gap structure with a reflective region and a transmissive region being different from each other in pretilt angle of liquid crystal molecules. JP 2016-133803 A discloses a transflective liquid crystal display panel in which different voltages are applied to a reflective region and a transmissive region.

SUMMARY

However, both the transflective liquid crystal display panels of JP 2004-199030 A and JP 2016-133803 A have a problem that the structure of the liquid crystal display panel becomes complex or the manufacturing process becomes complex for creating a structure for changing the pretilt angle of liquid crystal molecules between the reflective region and the transmissive region, or a structure for making a difference in voltage to be applied to the liquid crystal layer.

Therefore, an object of the present disclosure is to provide a transflective liquid crystal display panel having a structure that is simpler than that in the related art and that can be manufactured in a simpler manufacturing process than that in the related art.

According to the embodiments of the present disclosure, there are provided solutions according to the following items.

Item 1

A liquid crystal display panel including a plurality of pixels each including a reflective region for display in a reflection mode and a transmissive region for display in a transmission mode, the liquid crystal display panel including:

a first substrate and a second substrate;

a liquid crystal layer provided between the first substrate and the second substrate, the liquid crystal layer including a nematic liquid crystal material of negative dielectric anisotropy and a chiral agent;

a pixel electrode provided on a side of the first substrate, the pixel electrode including a reflective conductive layer and a transparent conductive layer, the side facing the liquid crystal layer;

a counter electrode provided on a side of the second substrate, the side facing the liquid crystal layer;

a light diffusing structure provided in common to the reflective region and the transmissive region; and a first vertical alignment film provided between the pixel electrode and the liquid crystal layer, and a second vertical alignment film provided between the counter electrode and the liquid crystal layer, wherein at least one of the first vertical alignment film and the second vertical alignment film includes an alignment regulating force defining a pretilt azimuthal direction, and in a case where a thickness of the liquid crystal layer in the reflective region is dr, and a thickness of the liquid crystal layer in the transmissive region is dt, dr and dt are within a range of $0.85 \leq dt/dr \leq 1.25$.

Item 2

The liquid crystal display panel according to item 1, wherein dt and dr satisfy $dt/dr=1.0$.

Item 3

The liquid crystal display panel according to item 1 or 2, wherein display is performed in a VA-HAN mode, the VA-HAN mode allowing only one of the first vertical alignment film and the second vertical alignment film to include an alignment regulating force defining a pretilt azimuthal direction.

Item 4

The liquid crystal display panel according to any one of items 1 to 3, wherein substantially a same voltage is applied to the liquid crystal layer in the reflective region and the liquid crystal layer in the transmissive region.

Item 5

The liquid crystal display panel according to any one of items 1 to 4,
wherein the light diffusing structure includes a concave-convex surface structure formed on the reflective conductive layer and the transparent conductive layer, and only the second vertical alignment film includes an alignment regulating force defining a pretilt azimuthal direction.

Item 6

The liquid crystal display panel according to any one of items 1 to 4,
wherein the light diffusing structure includes a concave-convex surface structure formed on the counter electrode, and only the first vertical alignment film includes an alignment regulating force defining a pretilt azimuthal direction.

Item 7

The liquid crystal display panel according to any one of items 1 to 4,
wherein the light diffusing structure includes a light diffusion layer in a transparent resin, the light diffusion layer including dispersed particles of a different refractive index from that of the transparent resin.

Item 8

The liquid crystal display panel according to item 7,
wherein the light diffusion layer is provided between the counter electrode and the second substrate.

Item 9

The liquid crystal display panel according to any one of items 1 to 8,
wherein in a case where a birefringence index of the nematic liquid crystal material is Δn, Δn*dr and Δn*dt are each independently within a range of not less than 0.19 μm and not greater than 0.31 μm, and a size of a chiral pitch of the liquid crystal layer is within a range of not less than 8 μm and not greater than 17 μm.

Item 10

The liquid crystal display panel according to any one of items 1 to 9,
wherein in a case where a birefringence index of the nematic liquid crystal material is Δn, Δn*dr and Δn*dt are each independently within a range of not less than 0.22 μm and not greater than 0.31 μm, and a size of a chiral pitch of the liquid crystal layer is within a range of not less than 9 μm and not greater than 14 μm.

Item 11

The liquid crystal display panel according to any one of items 1 to 10, further including:
a TFT connected to each of the plurality of pixels,
wherein the TFT includes an oxide semiconductor layer including an In—Ga—Zn—O-based semiconductor as an active layer.

Item 12

The liquid crystal display panel according to any one of items 1 to 11, further including:
memory circuits connected to the plurality of respective pixels.

According to embodiments of the present disclosure, a transflective liquid crystal display panel is provided that has a simpler structure than that in the related art and can be manufactured in a simpler manufacturing process than that in the related art.

BRIEF DESCRIPTION OF DRAWINGS

The disclosure will be described with reference to the accompanying drawings, wherein like numbers reference like elements.

DESCRIPTION OF EMBODIMENTS

Figure 1A:
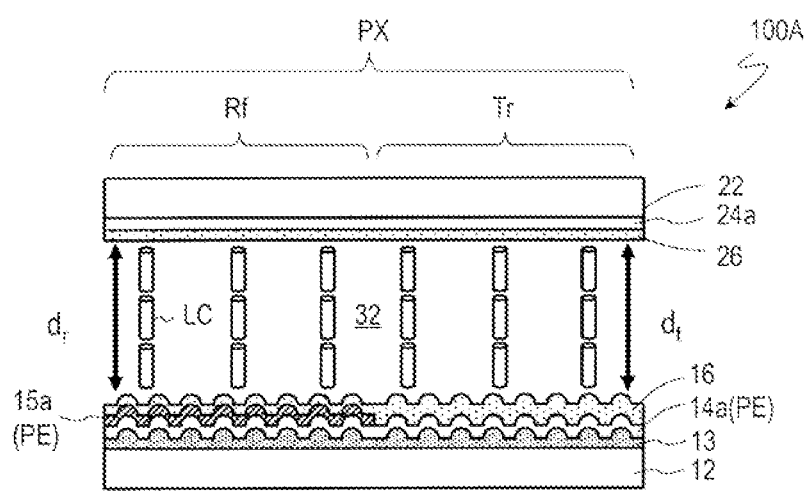
FIG. 1A is a schematic cross-sectional view of a liquid crystal display panel 100A in a VA-HAN mode according to an embodiment of the present disclosure, and also illustrates an alignment state of liquid crystal molecules in a case where no voltage is applied to a liquid crystal layer.

Hereinafter, a transflective liquid crystal display panel and a transflective liquid crystal display device provided with the same according to embodiments of the present disclosure will be described with reference to the drawings. Hereinafter, the transflective liquid crystal display panel is simply referred to as a liquid crystal display panel.

A liquid crystal display panel in a VA-HAN mode is exemplified as the liquid crystal display panel according to each embodiment, but the liquid crystal display panel according to the embodiments of the present disclosure is not limited thereto, and the embodiments are applicable to a liquid crystal display panel in a VA-TN mode.

A liquid crystal display panel according to an embodiment of the present disclosure includes a liquid crystal layer containing a nematic liquid crystal material with negative dielectric anisotropy and a chiral agent, and is a liquid crystal display panel of a normally black mode that displays black in a voltage unapplied state (black display voltage application state), and displays white in a voltage applied state (white display voltage applied state) displaying the highest gray scale. Liquid crystal molecules of the liquid crystal layer take a vertical alignment in the black display state and a twist alignment in the white display state. The liquid crystal layer is aligned and regulated by a pair of vertical alignment films, and only one of the vertical alignment films may be in a VA-HAN mode, which regulates the pretilt azimuthal direction (azimuth), or both of the vertical alignment films may be in a VA-TN mode which regulates the pretilt azimuthal direction. It is only required for the VA-HAN mode to perform an alignment treatment on one of the vertical alignment films and impart a force for regulating the pretilt azimuthal direction (azimuthal angle anchoring force), and thus the VA-HAN mode has an advantage that it can be more easily manufactured than a VA-TN mode in which alignment treatment needs to be performed on both of the vertical alignment films. As will be described later, in a case where it is difficult to impart a force for regulating the pretilt azimuthal direction by the alignment treatment, such as a case where the surface of the electrode has a concave-convex structure as a light diffusing structure, the VA-HAN mode is more advantageous than the VA-TN mode.

The twist angle is defined herein as follows. In a case where the liquid crystal display panel is viewed from above (from the viewer side), a direction twisted from the alignment azimuthal direction of the liquid crystal molecules in the vicinity of the lower side substrate to the alignment azimuthal direction of the liquid crystal molecules in the vicinity of the upper side substrate is referred to as a twist direction, and counterclockwise is referred to as a right handed twist, and clockwise is referred to as a left handed twist. The twist angle is positive in the right handed twist and negative in the left handed twist. However, for display characteristics, the right handed twist and the left handed twist are equivalent, and the magnitude (absolute value) of the twist angle holds meaning. In the following, since the liquid crystal layer that exhibits a left handed twist alignment in a case where a voltage is applied is exemplified, the twist angle is indicated as a negative value, but the same result is obtained in a case where the twist angle is indicated as a positive value. The chiral pitch is also indicated by a positive value in the right direction and a negative value in the left direction, but the magnitude (absolute value) of the chiral pitch holds meaning.

Note that in the following drawings, a pair of polarizers included in an upper portion and a lower portion of the liquid crystal display panel are omitted. Furthermore, a phase difference plate may be provided between each polarizer and the corresponding substrate. The polarizer (and the phase difference plate) are arranged so that the liquid crystal display panel performs display in the normally black mode.

First, a structure and an operation of a liquid crystal display panel 100A in a VA-HAN mode according to an embodiment of the present disclosure will be described with reference to FIGS. 1A and 1B. FIG. 1A is a schematic cross-sectional view of the liquid crystal display panel 100A, and also illustrating an alignment state of liquid crystal molecules in a case where no voltage is applied to a liquid crystal layer, and FIG. 1B also illustrates an alignment state of the liquid crystal molecules in a case where the highest gray-scale voltage (white display voltage) is applied to the liquid crystal layer.

Figure 1B:
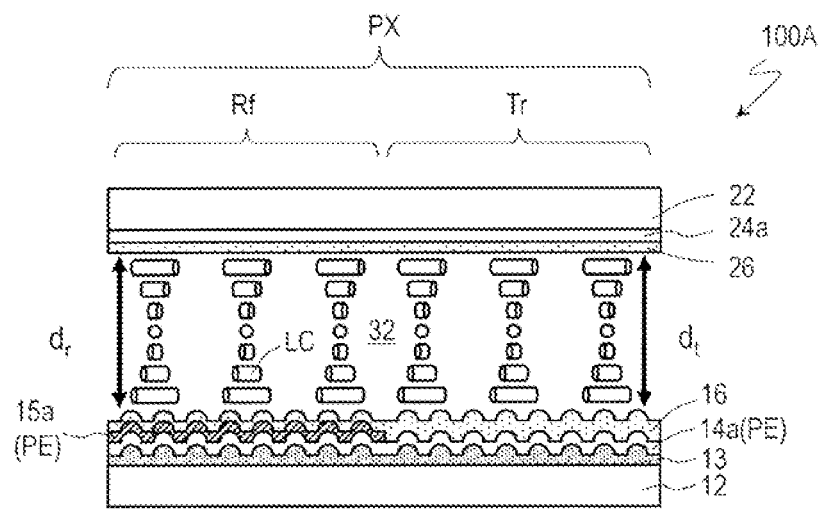
FIG. 1B is a schematic cross-sectional view of the liquid crystal display panel 100A in the VA-HAN mode according to an embodiment of the present disclosure, and also illustrates an alignment state of the liquid crystal molecules in a case where a white display voltage is applied to the liquid crystal layer.

The liquid crystal display panel 100A illustrated in FIGS. 1A and 1B includes a plurality of pixels PX each having a reflective region Rf for display in a reflection mode and a transmissive region Tr for display in a transmission mode. FIGS. 1A and 1B schematically illustrate a cross-sectional structure of a single pixel.

The liquid crystal display panel 100A includes: a first substrate 12 and a second substrate 22; a liquid crystal layer 32 provided between the first substrate 12 and the second substrate 22 and including a nematic liquid crystal material having negative dielectric anisotropy and a chiral agent; a pixel electrode PE provided on a liquid crystal layer 32 side of the first substrate 12 and including a reflective conductive layer 15a and a transparent conductive layer 14a; a counter electrode (also referred to as a common electrode) 24a provided on a liquid crystal layer side of the second substrate 22; and a first vertical alignment film 16 provided between the pixel electrode PE and the liquid crystal layer 32, and a second vertical alignment film 26 provided between the counter electrode 24a and the liquid crystal layer 32. A circuit (backplane circuit) (not illustrated) for driving pixels is formed on the substrate 12. The backplane circuit includes a TFT connected to the pixel electrode PE, and a gate bus line, a source bus line, and the like connected to the TFT. The TFT is, for example, a TFT having an oxide semiconductor layer including an amorphous silicon layer, a polysilicon layer, or an In—Ga—Zn—O-based semiconductor (see JP 2014-007399 A) as an active layer, and the backplane circuit can widely adopt known configurations. So-called memory liquid crystals including a memory circuit (e.g. SRAM) for each pixel can be employed (see, for example, JP 5036864 B). The entire disclosures of JP 2014-007399 A and JP 5036864 B are incorporated herein by reference.

The liquid crystal display panel 100A has a concave-convex structure on a surface of the pixel electrode PE, that is, the reflective conductive layer 15a and the transparent conductive layer 14a as a light diffusing structure provided in common with the reflective region Rf and the transmissive region Tr. The light diffusing structure is provided in order to perform paper white display in the reflection mode display, and in a known multi-gap transflective liquid crystal display panel, the light diffusing structure is provided only in the reflective region, but in the liquid crystal display panel 100A, the light diffusing structure is also commonly provided in the transmissive region. The concave-convex structure provided on the surface of the reflective conductive layer 15a and the transparent conductive layer 14a is obtained by forming the transparent conductive layer 14a and the reflective conductive layer 15a on a resin layer 13 having the concave-convex surface structure. The resin layer 13 having the concave-convex surface structure is formed by using a photosensitive resin, as described, for example, in JP 3394926 B. The concave-convex surface structure can, for example, be constituted by a plurality of protruding portions arranged randomly such that a center spacing of adjacent protruding portions is 5 μm or more and 50 μm or less, and preferably 10 μm or more and 20 μm or less. In a case of being viewed from the substrate normal direction, the shapes of the protruding portions are substantially circular or substantially polygonal. The area of the protruding portions occupying the pixel PX is, for example, from approximately 20% to 40%. The heights of the protruding portions are not less than 1 μm and not greater than 5 μm, for example. The area of the reflective region Rf occupying the pixel PX may be appropriately set depending on the application and the like, but is, for example, not less than 20% and not greater than 90%. The position of the reflective region Rf within the pixel PX may also be appropriately set depending on the application or the like.

The transparent conductive layer 14a can be formed by a known method by using, for example, indium tin oxide (ITO), indium zinc oxide (IZO (trade name)), or a mixture thereof. The reflective conductive layer 15a may be formed by a known method by using a metal material having a high reflectivity such as silver, aluminum, or aluminum alloy. Here, an example is illustrated in which the reflective conductive layer 15a is formed so as to directly contact the transparent conductive layer 14a, but the connection structure between the reflective conductive layer 15a and the transparent conductive layer 14a may be any. However, the same voltage is supplied to the reflective conductive layer 15a and the transparent conductive layer 14a. Note that the counter electrode 24a may also be formed by a known method by using a material similar to that of the transparent conductive layer 14a.

The first vertical alignment film 16 and the second vertical alignment film 26 are formed by a known method by using a known vertical alignment film material. Here, only the second vertical alignment film 26 formed on the counter electrode 24a that does not have a concave-convex structure on the surface has an alignment regulating force that defines the pretilt azimuthal direction. In other words, only the second vertical alignment film 26 is subjected to an alignment treatment (for example, rubbing processing or light alignment treatment). Since the surface of the first vertical alignment film 16 has a concave-convex structure, a stable alignment regulating force may not be obtained even in a case where the alignment treatment is performed.

The liquid crystal layer 32 included in the liquid crystal display panel 100A has a continuous structure across the entire pixel PX, and even in a voltage unapplied state (see FIG. 1A), or even in the voltage applied state (see FIG. 1B), the liquid crystal layer 32 is substantially in the same alignment state in the reflective region Rf and the transmissive region Tr. The thickness dr of the liquid crystal layer 32 in the reflective region Rf and the thickness dt of the liquid crystal layer 32 in the transmissive region Tr are substantially the same, but the thickness dr of the liquid crystal layer 32 in the reflective region Rf and the thickness dt of the liquid crystal layer 32 in the transmissive region Tr may vary depending on differences in the layered structure of the pixel electrode PE and the like. As described below, in a case of a range within $0.85 \leq dt/dr \leq 1.25$, the luminance in the transmission mode can be 90% or greater of the maximum value.

The liquid crystal display panel 100A includes two circular polarizers (a layered body of a linear polarizer and a quarter wavelength plate) arranged to perform display in the normally black mode, on the lower side of the substrate 12 and the upper side of the substrate 22. At this time, there is no restriction on the arrangement relationship between the pretilt azimuthal direction and the absorption axis of the polarizer. In evaluating the characteristics of the transflective liquid crystal display device, a backlight device is disposed on the lower side of the substrate 12. Note that a one-half wavelength plate may be further disposed between the circular polarizer and each of the substrate 12 and the substrate 22, and the color and viewing angle characteristics due to wavelength dispersion may be improved. The arrangement of the polarizer and the phase difference plate is not limited to the examples described above, and various known combinations can be applied.

The liquid crystal display panel 100A displays black in a voltage unapplied state (a state in which a voltage lower than a threshold voltage is applied), as illustrated in FIG. 1A. At this time, liquid crystal molecules LC of the liquid crystal layer 32 are aligned vertically under the alignment regulating forces of the vertical alignment films 16 and 26. In a case where a voltage corresponding to a potential difference between the pixel electrode PE and the counter electrode 24a is applied to the liquid crystal layer 32, the liquid crystal molecules LC having negative dielectric anisotropy fall down. The vertical alignment film 26 is subjected to an alignment treatment (for example, a rubbing processing), and the azimuthal direction in which the liquid crystal molecules LC in the vicinity of the vertical alignment film 26 fall down (that is, the pretilt azimuthal direction) is an azimuthal direction regulated by the vertical alignment film 26.

In the liquid crystal layer 32, a chiral agent is mixed together with a nematic liquid crystal material having negative dielectric anisotropy, and the liquid crystal molecules LC twist aligned in the directions defined by the chiral agent. The alignment state of the liquid crystal molecules LC in a case where a white display voltage is applied to the liquid crystal layer 32 is, for example, a twist alignment as illustrated in FIG. 1.

The liquid crystal molecules LC of the liquid crystal layer 32 twist in the directions defined by the chiral agent continuously with the liquid crystal molecules LC that have fallen down in the pretilt azimuthal direction defined by the vertical alignment film 26. The alignment azimuthal direction of the liquid crystal molecules LC in the vicinity of the vertical alignment film 16 is an azimuthal direction determined by the chiral pitch that varies depending on the type and the amount of the chiral agent (the length in the thickness direction required for the liquid crystal molecules to twist by 360°) and the thickness of the liquid crystal layer 32 (cell gap).

Note that the liquid crystal molecules (not illustrated) extremely near the vertical alignment films 26 and 16 are strongly subjected to the alignment regulating forces (polar angle anchoring) of the vertical alignment films 26 and 16, and are aligned substantially vertically even in a case where a white voltage is applied. There are liquid crystal molecules that are strongly aligned and regulated by the vertical alignment films 26 and 16 in this manner, and hence in a case where the voltage is removed, the liquid crystal molecules reversibly return to the vertical alignment state and can display black. The liquid crystal molecules LC illustrated in FIG. 1A, FIG. 1B, and the like are only liquid crystal molecules LC that can change the alignment direction by applying a voltage to the liquid crystal layer 32.

As explained later illustrating simulation results, the birefringence index Δn of the liquid crystal material, the thickness d (dt, dr) of the liquid crystal layer 32, and the chiral pitch affect display characteristics such as luminance, contrast ratio, and the like of the liquid crystal display panel. In a case where the birefringence index of the nematic liquid crystal material is Δn, the retardations Δn*dr and Δn*dt represented by the product of Δn and the thickness (dr, dt) of the liquid crystal layer 32 are each preferably within a range of not less than 0.19 μm and not greater than 0.31 μm independently, and the chiral pitch of the liquid crystal layer is preferably in a range of not less than 8 μm and not greater than 17 μm. At this time, the magnitude of the twist angle in a case where the highest gray scale display voltage is applied to the liquid crystal layer 32 is not less than 31° and not greater than 110°. Δn*dr and Δn*dt are each further preferably within a range of not less than 0.22 μm and not greater than 0.31 μm independently, and the chiral pitch of the liquid crystal layer 32 is further preferably within a range of not less than 9 μm and not greater than 14 μm. At this time, the magnitude of the twist angle in a case where the highest gray scale display voltage is applied to the liquid crystal layer 32 is not less than 41° and not greater than 98°.

The liquid crystal display panel 100A having such a structure has a simpler structure than that of a known single cell gap structure transflective liquid crystal display panel, and can be manufactured in a simpler manufacturing process than that in the related art. Specifically, the same voltage may be supplied to the reflective conductive layer 15a and the transparent conductive layer 14a of the pixel electrode PE, and the alignment of the liquid crystal molecules LC in the liquid crystal layer 32 may also be the same for the reflective region Rf and the transmissive region Tr. The alignment treatment of the vertical alignment film 26 may be the same for the reflective region Rf and the transmissive region Tr. The concave-convex surface structure as the light diffusing structure may also be the same for the reflective region Rf and the transmissive region Tr. Thus, for example, in a case where the area ratio between the reflective region Rf and the transmissive region Tr is changed, only the area that forms the reflective conductive layer 15a may simply be changed.

Figure 2:
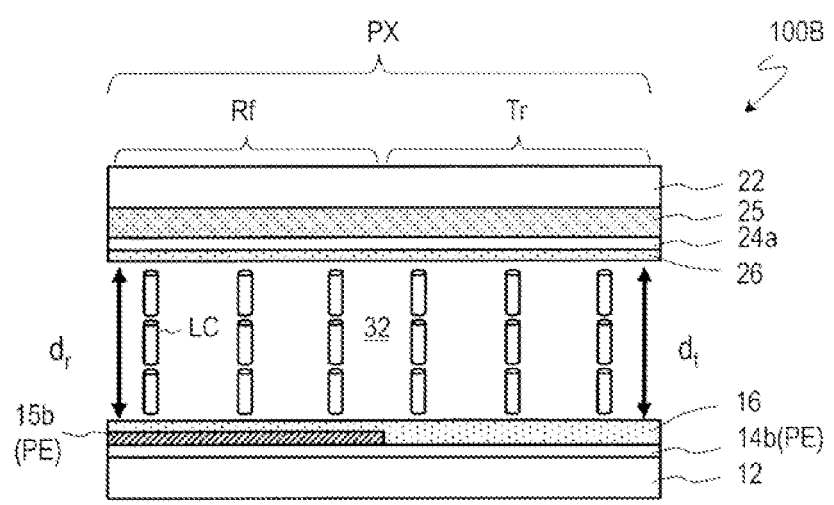
FIG. 2 is a schematic cross-sectional view of a liquid crystal display panel 100B in the VA-HAN mode according to another embodiment of the present disclosure, and also illustrates an alignment state of liquid crystal molecules in a case where no voltage is applied to a liquid crystal layer.

The liquid crystal display panel 100A according to embodiment of the present disclosure may be variously modified. FIG. 2 illustrates a schematic cross-sectional view of a liquid crystal display panel 100B according to another embodiment of the present disclosure. FIG. 2 also illustrates the alignment state of liquid crystal molecules in a case where no voltage is applied to the liquid crystal layer 32. Constituent elements having substantially the same functions as those of the constituent elements illustrated in FIGS. 1A and 1B may be denoted by common reference signs in the following drawings and descriptions thereof may be omitted.

The liquid crystal display panel 100B differs from the liquid crystal display panel 100A in that a light diffusion layer 25 is provided in a transparent resin in which particles having a different refractive index from that of the transparent resin are dispersed as a diffusing structure provided in common to the reflective region Rf and the transmissive region Tr. The pixel electrode PE of the liquid crystal display panel 100B does not need to have a light diffusing structure, and the reflective conductive layer 15b and the transparent conductive layer 14b have a flat surface. In the liquid crystal display panel 100B, both of the first vertical alignment film 16 and the second vertical alignment film 26 have a flat surface, so an alignment treatment may be performed on either one. Both of the first vertical alignment film 16 and the second vertical alignment film 26 may be subjected to an alignment treatment to modify the liquid crystal display panel in the VA-TN mode.

The light diffusion layer 25 can be formed by using a known material. The light diffusion layer 25 is provided between the counter electrode 24a and the second substrate 22. The light diffusion layer 25 may also serve as a color filter layer, for example. The light diffusion layer 25 may also be provided between the transparent conductive layer 14b and the substrate 12. Furthermore, the light diffusion layer 25 may be provided in the liquid crystal display panel 100A.

Figure 3:
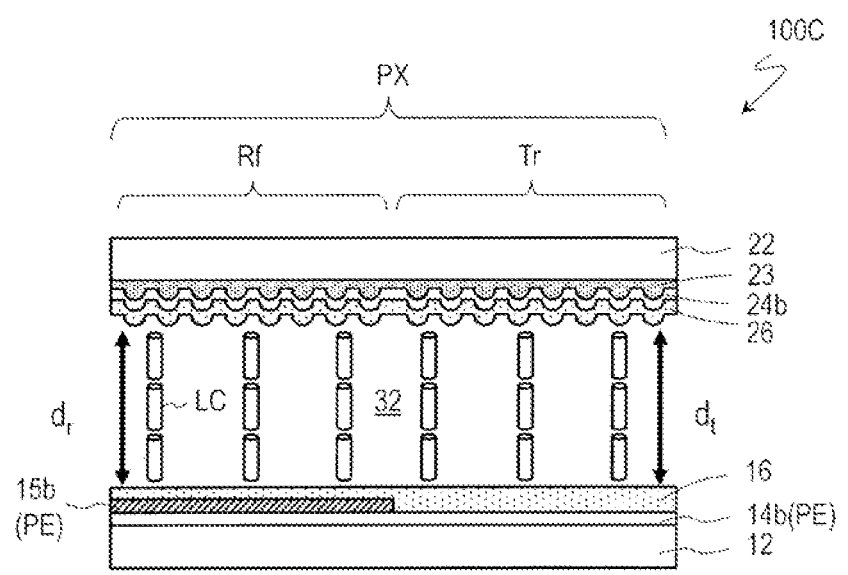
FIG. 3 is a schematic cross-sectional view of a liquid crystal display panel 100C in the VA-HAN mode according to yet another embodiment of the present disclosure, and also illustrates an alignment state of liquid crystal molecules in a case where no voltage is applied to a liquid crystal layer.

FIG. 3 illustrates a schematic cross-sectional view of a liquid crystal display panel 100C according to yet another embodiment of the present disclosure. FIG. 3 also illustrates the alignment state of liquid crystal molecules in a case where no voltage is applied to the liquid crystal layer 32. The liquid crystal display panel 100C has a concave-convex surface structure in the counter electrode 24b as a diffusing structure provided in common to the reflective region Rf and the transmissive region Tr. The concave-convex surface structure of the counter electrode 24b is obtained by forming the counter electrode 24 on a resin layer 23 having a concave-convex surface structure. The resin layer 23 can be formed in a similar manner to that of the resin layer 13 described above. In the liquid crystal display panel 100C, an alignment treatment is preferably performed on the vertical alignment film 16 having a flat surface.

Next, the display characteristics of the liquid crystal display panel 100A will be described with reference to FIG. 4 to FIG. 6.

Figure 4:
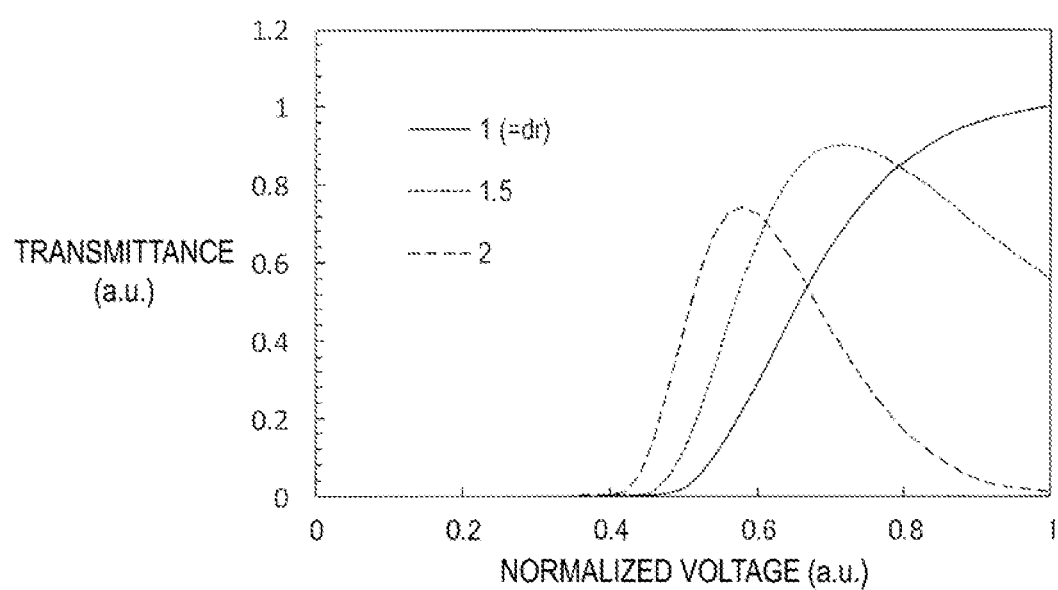
FIG. 4 is a graph showing voltage-transmittance curves of transmissive regions of liquid crystal display panels in the VA-HAN mode with cell gaps of the transmissive regions (each normalized with a cell gap of a reflective region) being different from each other.
Figure 5:
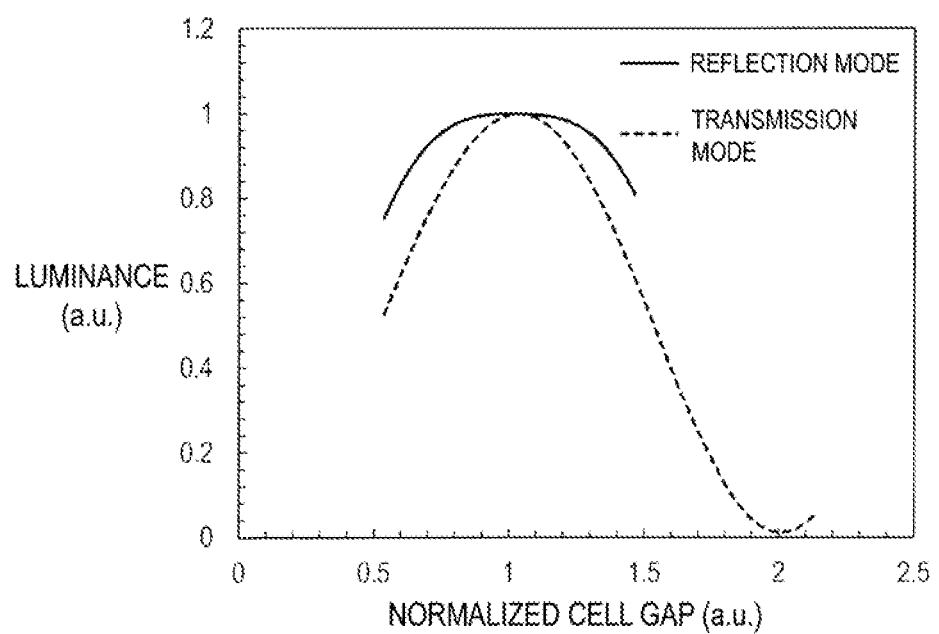
FIG. 5 is a graph showing a relationship between the cell gap of the transmissive region (normalized with the cell gap of the reflective region) in each liquid crystal display panel in the VA-HAN mode and luminance in each of a reflection mode and a transmission mode.

FIG. 4 and FIG. 5 show results obtained by using liquid crystal simulation software called LCD master manufactured by Shintec Co., Ltd. In a case where Δn*d (d=dr=dt) of the liquid crystal layer 32 was 0.28 μm and the chiral pitch was −11 μm, the highest quality display was obtained (see Table 1 and Table 2). A nematic liquid crystal material having Δn of 0.1 and a negative dielectric anisotropy was used as the nematic liquid crystal material. Accordingly, the value of Δn*d multiplied by 10 is the cell gap (the thickness of the liquid crystal layer). At this time, the twist angle in the white display state was 72°.

Note that here, in a case of being viewed from above, the azimuthal direction of the absorption axis of the lower side linear polarizer, the azimuthal direction of the slow axis of the lower side quarter wavelength plate, the pretilt azimuthal direction of the second vertical alignment film 26, the azimuthal direction of the slow axis of the upper side quarter wavelength plate, and the azimuthal direction of the absorption axis of the lower side linear polarizer were such that the azimuthal direction of the absorption axis of the lower side linear polarizer was −45°, the azimuthal direction of the slow axis of the lower side quarter wavelength plate was 0°, the pretilt azimuthal direction of the second vertical alignment film 26 was −50°, the azimuthal direction of the slow axis of the upper side quarter wavelength plate was +90°, and the azimuthal direction of the alignment of the absorption axis of the upper side linear polarizer was +45°, assuming that the 3 o'clock direction of a clock face was 0° and the counterclockwise direction was positive.

Figure 6:
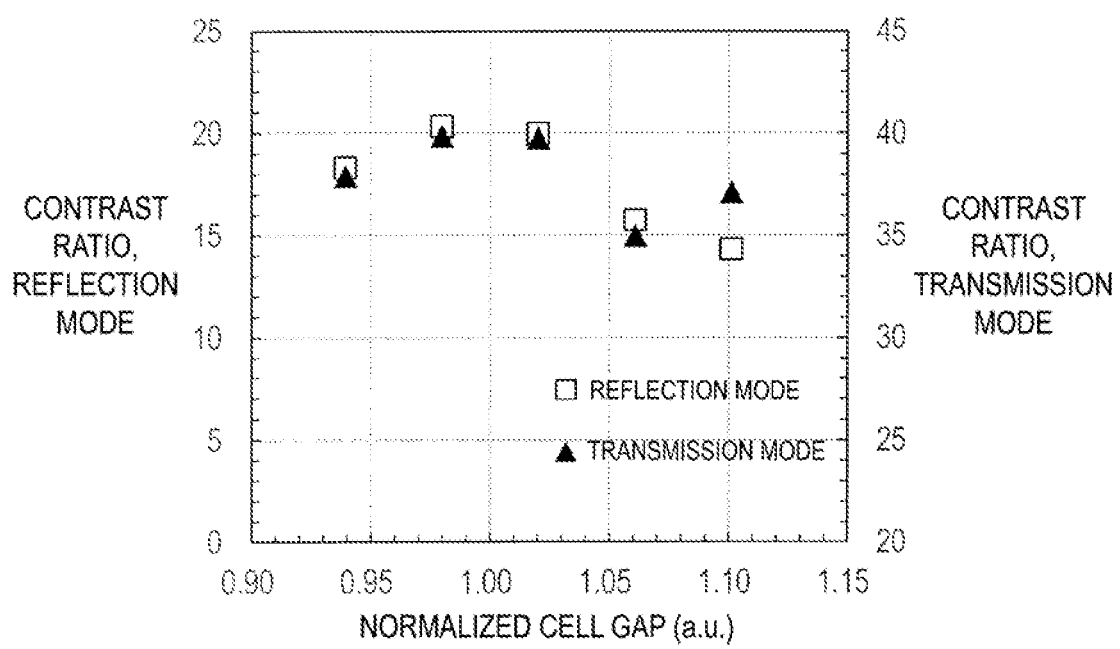
FIG. 6 is a graph showing a relationship between the cell gap of the transmissive region (normalized with the cell gap of the reflective region) in each liquid crystal display panel in the VA-HAN mode and a contrast ratio in each of the reflection mode and the transmission mode.

FIG. 6 shows results of evaluating actually prepared transflective liquid crystal display panels. The panel size was 31.5 inches, and the number of pixels count was 1920*RGB*1020. The area ratio of the reflective region Rf and the transmissive region Tr was 4.3:1. The reflection characteristics were measured by using a spectrophotometer called CM-700d manufactured by KONICA MINOLTA, INC. Transmission characteristics were measured by using a spectrophotometer called SR-UL1R manufactured by TOPCON CORPORATION.

FIG. 4 shows voltage-transmittance curves of transmissive regions of liquid crystal display panels in the VA-HAN mode with cell gaps of the transmissive regions (each normalized with a cell gap of a reflective region) being different from each other. In FIG. 4, "1" represents dt=dr, "1.5" represents dt=1.5 dr, and "2" represents dt=2 dr. In FIG. 4, "1" corresponds to a voltage-transmittance curve of the transmissive region of the liquid crystal display panel 100A in which the above-described highest quality display has been obtained.

FIG. 5 is a graph showing a relationship between the cell gap of the transmissive region (normalized with the cell gap of the reflective region) in each liquid crystal display panel in the VA-HAN mode and luminance in each of the reflection mode and the transmission mode.

As can be seen from FIG. 4, in a case of dt=dr, the transmittance of the transmissive region Tr is maximized. As can be seen from FIG. 5, in a case of dt=dr, luminance in the reflection mode is maximized, and luminance in the transmission mode is also maximized. In a case of a range within 0.85≤dt/dr≤1.25, the luminance in the transmission mode is 90% or greater of the maximum value.

FIG. 6 shows a relationship between the cell gap of the transmissive region (normalized with the cell gap of the reflective region) in each liquid crystal display panel in the VA-HAN mode and a contrast ratio in each of the reflection mode and the transmission mode. Five types of liquid crystal display panels having the normalized cell gap of the transmissive region being 0.94, 0.98, 1.02, 1.06, and 1.10 were prepared. The case where the normalized cell gap is 1.00 corresponds to the liquid crystal display panel 100A in which the above-described highest quality display has been obtained. As can be seen from FIG. 6, in a case of dt=dr, the contrast ratio of the reflection mode as well as the contrast ratio of the transmission mode are maximized. In cases where the normalized cell gap in the transmissive region was 0.98 or 1.02, the contrast ratio of the reflection mode was 20 and the contrast ratio of the transmission mode was 40, and a high quality display was obtained.

In this way, by optimizing $\Delta n^*d$ and the chiral pitch of the liquid crystal layer 32, the display quality can be maximized in both the display in the reflection mode and the display in the transmission mode with the same cell gap (dt=dr).

Figure 7:
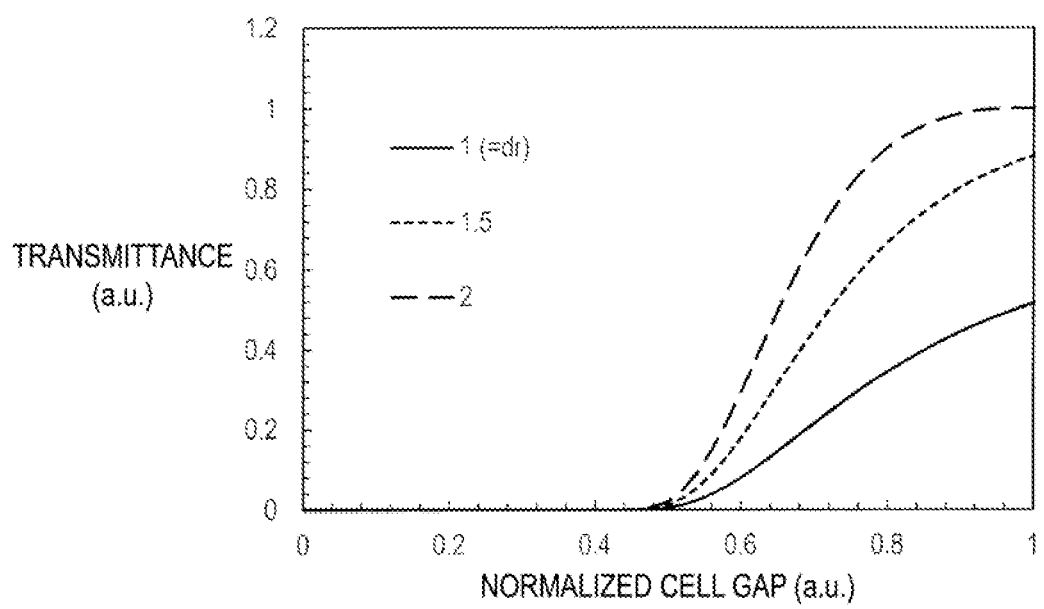
FIG. 7 is a graph showing voltage-transmittance curves of transmissive regions of liquid crystal display panels in a VA mode of a comparative example with cell gaps of the transmissive regions (each normalized with a cell gap of the reflective region) being different from each other.
Figure 8:
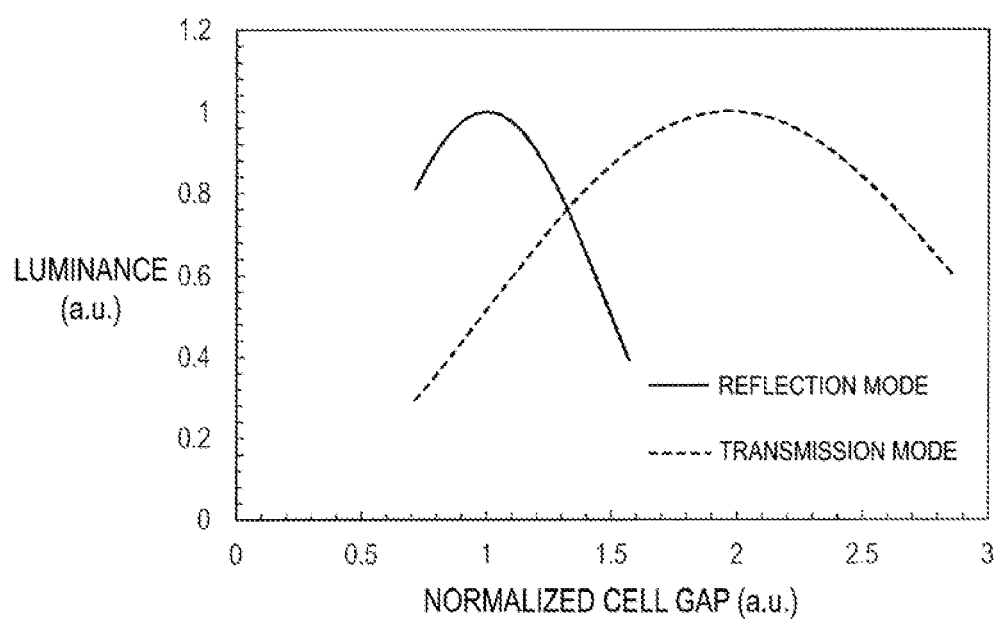
FIG. 8 is a graph showing a relationship between the cell gap of the transmissive region (normalized with the cell gap of the reflective region) in each liquid crystal display panel in the VA mode and luminance in each of the reflection mode and the transmission mode.

This cannot be expected enough from the display characteristics of a known VA mode transflective liquid crystal display panel. FIG. 7 shows voltage-transmittance curves of transmissive regions of liquid crystal display panels in the VA mode of a comparative example with thicknesses of the liquid crystal layers of the transmissive regions (normalized by the thickness of the liquid crystal layer in the reflective region) being different from each other, and FIG. 8 shows a relationship between the cell gap and luminance in each of the reflection mode and the transmission mode in each liquid crystal display panel in the VA mode. FIG. 7 and FIG. 8 for the VA mode correspond respectively to FIG. 4 and FIG. 5 in the previous VA-HAN mode. Note that in each transflective liquid crystal display panel in the VA mode, a concave-convex surface structure was only provided on the reflective conductive layer.

As can be seen from FIG. 7, in the VA mode, the transmittance in the transmissive region is maximized in a case of dt=2 dr, and as can be seen in FIG. 8, the luminance in the transmission mode in the VA mode is maximized in a case of dt=2 dr.

Next, the relationship between the display characteristics of the liquid crystal display panel 100A in the VA-HAN mode and $\Delta n^*d$ and the chiral pitch of the liquid crystal layer 32 will be described.

Figure 9A:
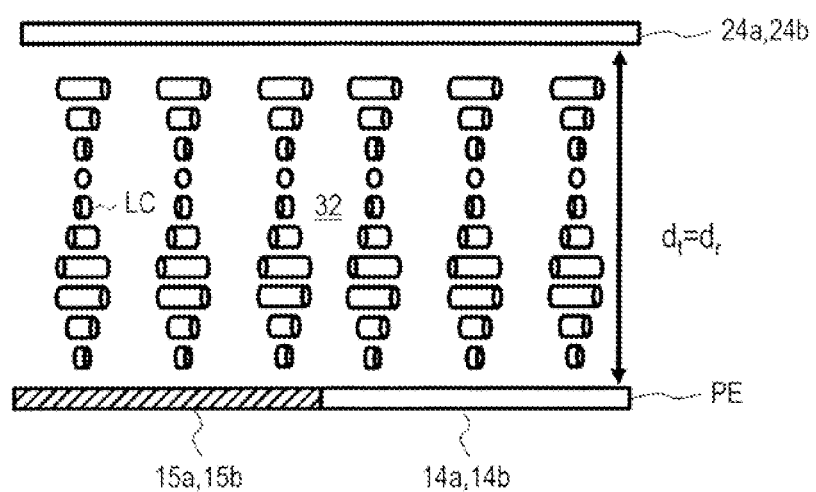
FIG. 9A is a schematic view illustrating an example of an alignment state of liquid crystal molecules in a case where a white display voltage is applied to a liquid crystal layer of a liquid crystal display panel in the VA-HAN mode, and illustrates a case where the cell gap is large (the twist angle is large or the chiral pitch is small).
Figure 9B:
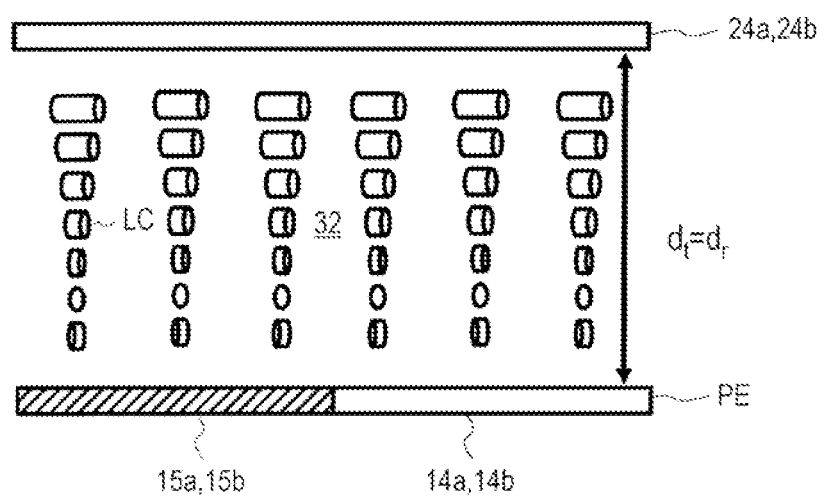
FIG. 9B is a schematic view illustrating an example of an alignment state of the liquid crystal molecules in a case where a white display voltage is applied to the liquid crystal layer of the liquid crystal display panel in the VA-HAN mode, and illustrates a case where the cell gap is small (the twist angle is small or the chiral pitch is large).
Figure 10:
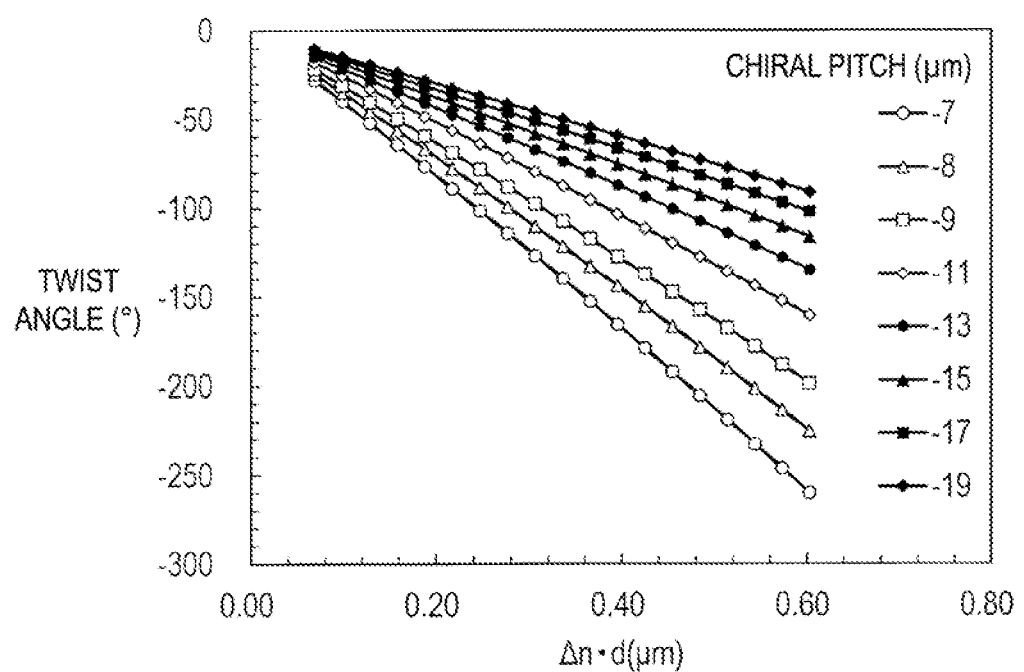
FIG. 10 is a graph showing relationships between Δn*d and the twist angle of the liquid crystal layer of the liquid crystal display panel in the VA-HAN mode.
Figure 11:
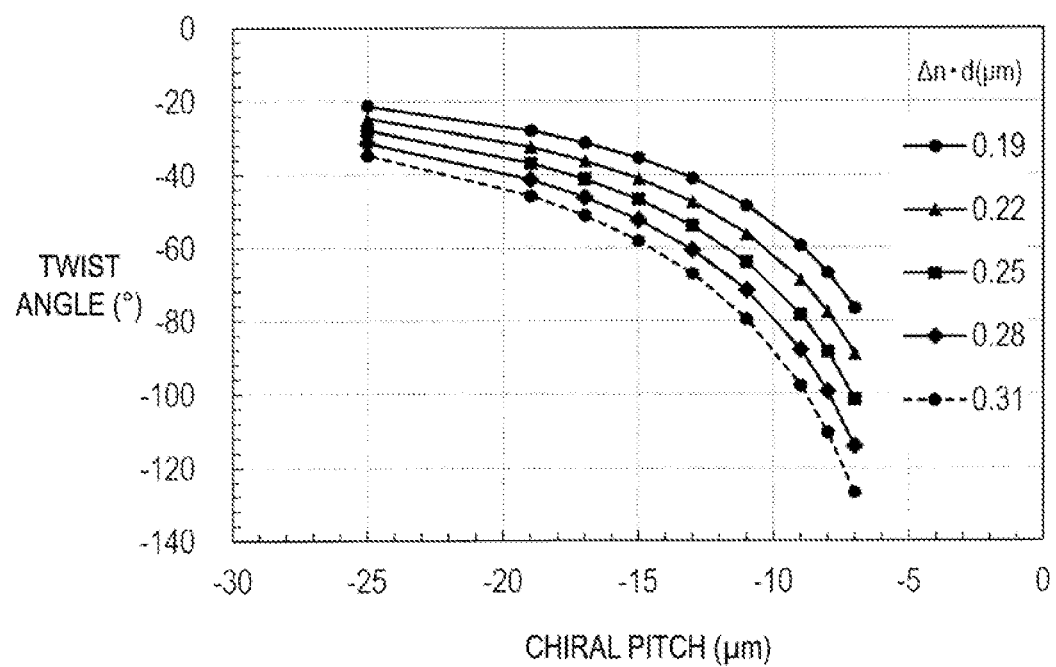
FIG. 11 is a graph showing relationships between the chiral pitch and the twist angle of the liquid crystal layer of the liquid crystal display panel in the VA-HAN mode.

FIG. 9A is a schematic view illustrating an example of an alignment state of liquid crystal molecules in a case where a white display voltage is applied to the liquid crystal layer of the liquid crystal display panel in the VA-HAN mode, and illustrates a case where the cell gap is large (the twist angle is large or the chiral pitch is small). FIG. 9B is a schematic view illustrating an example of an alignment state of liquid crystal molecules in a case where a white display voltage is applied to the liquid crystal layer of the liquid crystal display panel in the VA-HAN mode, and illustrates a case where the cell gap is small (the twist angle is small or the chiral pitch is large). Thus, in a case where the cell gap and the chiral pitch are changed, $\Delta n^*d$ changes, and also the twist angle changes. These relationships are shown in FIG. 10 and FIG. 11. FIG. 10 is a graph showing relationships between $\Delta n^*d$ and the twist angle of a liquid crystal layer for respective different chiral pitches, and FIG. 11 is a graph showing relationships between the chiral pitch and the twist angle of the liquid crystal layer for respective different $\Delta n^*d$.

Results of varying $\Delta n^*d$ and the chiral pitch and evaluating display characteristics are illustrated in Table 1 in order to find an optimal combination of $\Delta n^*d$ and the chiral pitch, and the corresponding twist angle is illustrated in Table 2. The display characteristics were evaluated for the luminance, the gray-scale inversion, and the like in the white display state in the reflection mode and the transmission mode. With reference to the display quality of the highest quality of the liquid crystal display panel 100A described above, those in which the luminance in the reflection mode is approximately 80% or greater, the luminance in the transmission mode is approximately 65% or greater, the gray-scale inversion in each of the transmission mode and the reflection mode is 3% or less, and the change from the light source color (expressed as chromaticity x, y) falls within the range of $\Delta x$: from approximately −0.03 to approximately +0.02 and $\Delta y$: from approximately −0.03 to approximately +0.01 were given an excellent determination. Conditions that did not satisfy part of the above reference but were close to the excellent determination were given good and marginal determinations in order. Note that a gray-scale inversion of 3% or less means that the luminance at the white display voltage is within 3% of the maximum luminance at a halftone display voltage (a voltage between black display and white display) (that is, 0.97 or greater in a case where the maximum luminance is 1.00).

Table 1

TABLE 1

| | | $\Delta n \cdot d (\mu m)$ | | | | | | |
|---|---|---|---|---|---|---|---|---|
| | | 0.16 | 0.19 | 0.22 | 0.25 | 0.28 | 0.31 | 0.34 |
| chiral pitch ($\mu m$) | −7 | — | Δ | ○ | ○ | Δ | Δ | X |
| | −8 | Δ | ○ | ◎ | ◎ | ○ | ○ | Δ |
| | −9 | ○ | ◎ | ◎ | ◎ | ◎ | ○ | Δ |
| | −11 | ○ | ◎ | ◎ | ◎ | ◎ | ◎ | ○ |
| | −13 | Δ | ○ | ◎ | ◎ | ◎ | ◎ | ○ |
| | −15 | Δ | ○ | ◎ | ◎ | ◎ | ○ | Δ |
| | −17 | Δ | ○ | ◎ | ◎ | ○ | ○ | Δ |
| | −19 | Δ | ○ | ◎ | ◎ | ○ | Δ | X |
| | −25 | Δ | ○ | ◎ | ○ | Δ | X | X |
| | non | X | X | X | X | X | — | — |

TABLE 2

|  |  | Δn · d(μm) | | | | | | |
|---|---|---|---|---|---|---|---|---|
|  |  | 0.16 | 0.19 | 0.22 | 0.25 | 0.28 | 0.31 | 0.34 |
| chiral | −7 | −64 | −77 | −89 | −101 | −114 | −127 | −140 |
| pitch | −8 | −56 | −67 | −78 | −88 | −99 | −110 | −121 |
| (μm) | −9 | −50 | −59 | −69 | −78 | −88 | −98 | −107 |
|  | −11 | −41 | −48 | −56 | −64 | −72 | −80 | −87 |
|  | −13 | −34 | −41 | −47 | −54 | −60 | −67 | −74 |
|  | −15 | −30 | −35 | −41 | −47 | −52 | −58 | −64 |
|  | −17 | −26 | −31 | −36 | −41 | −46 | −51 | −56 |
|  | −19 | −24 | −28 | −32 | −37 | −41 | −46 | −50 |
|  | −25 | −18 | −21 | −25 | −28 | −31 | −35 | −38 |

As can be seen from the results in Table 1, Δn*d is preferably within a range of not less than 0.19 μm and not greater than 0.31 μm, and the chiral pitch of the liquid crystal layer is preferably in a range of not less than 8 μm and not greater than 17 μm. At this time, the magnitude of the twist angle in a case where the highest gray scale display voltage is applied to the liquid crystal layer 32 is not less than 31° and not greater than 110°. Δn*d is more preferably in a range of not less than 0.22 μm and not greater than 0.31 μm, and the chiral pitch of the liquid crystal layer 32 is more preferably within a range of not less than 9 μm and not greater than 14 μm. At this time, the magnitude of the twist angle in a case where the highest gray scale display voltage is applied to the liquid crystal layer 32 is not less than 41° and not greater than 98°.

INDUSTRIAL APPLICABILITY

The present disclosure can be broadly applied to transflective liquid crystal display panels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display panel including a plurality of pixels each including a reflective region for display in a reflection mode and a transmissive region for display in a transmission mode, the liquid crystal display panel comprising:
   a first substrate and a second substrate;
   a liquid crystal layer provided between the first substrate and the second substrate, the liquid crystal layer including a nematic liquid crystal material of negative dielectric anisotropy and a chiral agent;
   a pixel electrode provided on a side of the first substrate, the pixel electrode including a reflective conductive layer and a transparent conductive layer, the side facing the liquid crystal layer;
   a counter electrode provided on a side of the second substrate, the side facing the liquid crystal layer;
   a light diffusing structure provided in common to the reflective region and the transmissive region; and
   a first vertical alignment film provided between the pixel electrode and the liquid crystal layer, and a second vertical alignment film provided between the counter electrode and the liquid crystal layer,
   wherein at least one of the first vertical alignment film and the second vertical alignment film includes an alignment regulating force defining a pretilt azimuthal direction,
   in a case where a thickness of the liquid crystal layer in the reflective region is dr, and a thickness of the liquid crystal layer in the transmissive region is dt, dr and dt are within a range of 0.85≤dt/dr≤1.25, and
   wherein in a case where a birefringence index of the nematic liquid crystal material is Δn, Δn*dr and Δn*dt are each independently within a range of not less than 0.19 μm and not greater than 0.31 μm, and a size of a chiral pitch of the liquid crystal layer is within a range of not less than 8 μm and not greater than 17 μm.

2. The liquid crystal display panel according to claim 1, wherein dt and dr satisfy dt/dr=1.0.

3. The liquid crystal display panel according to claim 1, wherein display is performed in a VA-HAN mode, the VA-HAN mode allowing only one of the first vertical alignment film and the second vertical alignment film to include an alignment regulating force defining a pretilt azimuthal direction.

4. The liquid crystal display panel according to claim 1, wherein substantially a same voltage is applied to the liquid crystal layer in the reflective region and the liquid crystal layer in the transmissive region.

5. The liquid crystal display panel according to claim 1, wherein the light diffusing structure includes a concave-convex surface structure formed on the reflective conductive layer and the transparent conductive layer, and only the second vertical alignment film includes an alignment regulating force defining a pretilt azimuthal direction.

6. The liquid crystal display panel according to claim 1, wherein the light diffusing structure includes a concave-convex surface structure formed on the counter electrode, and only the first vertical alignment film includes an alignment regulating force defining a pretilt azimuthal direction.

7. The liquid crystal display panel according to claim 1, wherein the light diffusing structure includes a light diffusion layer in a transparent resin, the light diffusion layer including dispersed particles of a different refractive index from that of the transparent resin.

8. The liquid crystal display panel according to claim 7, wherein the light diffusion layer is provided between the counter electrode and the second substrate.

9. The liquid crystal display panel according to claim 1, wherein in a case where a birefringence index of the nematic liquid crystal material is Δn, Δn*dr and Δn*dt are each independently within a range of not less than 0.22 μm and not greater than 0.31 μm, and a size of a chiral pitch of the liquid crystal layer is within a range of not less than 9 μm and not greater than 14 μm.

10. The liquid crystal display panel according to claim 1, further comprising:
    a TFT connected to each of the plurality of pixels,
    wherein the TFT includes an oxide semiconductor layer including an In—Ga—Zn—O-based semiconductor as an active layer.

11. The liquid crystal display panel according to claim 1, further comprising:
    memory circuits connected to the plurality of respective pixels.

12. A liquid crystal display panel including a plurality of pixels each including a reflective region for display in a reflection mode and a transmissive region for display in a transmission mode, the liquid crystal display panel comprising:
    a first substrate and a second substrate;

a liquid crystal layer provided between the first substrate and the second substrate, the liquid crystal layer including a nematic liquid crystal material of negative dielectric anisotropy and a chiral agent;

a pixel electrode provided on a side of the first substrate, the pixel electrode including a transparent conductive layer and a reflective conductive layer formed on the transparent conductive layer in the reflective region, the side facing the liquid crystal layer;

a counter electrode provided on a side of the second substrate, the side facing the liquid crystal layer;

a light diffusing structure provided in common to the reflective region and the transmissive region; and a first vertical alignment film provided between the pixel electrode and the liquid crystal layer, and a second vertical alignment film provided between the counter electrode and the liquid crystal layer, wherein at least one of the first vertical alignment film and the second vertical alignment film includes an alignment regulating force defining a pretilt azimuthal direction, in a case where a thickness of the liquid crystal layer in the reflective region is dr, and a thickness of the liquid crystal layer in the transmissive region is dt, dr and dt are within a range of $0.85 \leq dt/dr \leq 1.25$, and in a case where a birefringence index of the nematic liquid crystal material is $\Delta n$, $\Delta n^*dr$ and $\Delta n^*dt$ are each independently within a range of not less than 0.19 μm and not greater than 0.31 μm, and a size of a chiral pitch of the liquid crystal layer is within a range of not less than 8 μm and not greater than 17 μm.

13. The liquid crystal display panel according to claim 12, wherein dt and dr satisfy dt/dr=1.0.

14. The liquid crystal display panel according to claim 12, wherein display is performed in a VA-HAN mode, the VA-HAN mode allowing only one of the first vertical alignment film and the second vertical alignment film to include an alignment regulating force defining a pretilt azimuthal direction.

15. The liquid crystal display panel according to claim 12, wherein substantially a same voltage is applied to the liquid crystal layer in the reflective region and the liquid crystal layer in the transmissive region.

16. The liquid crystal display panel according to claim 12, wherein the light diffusing structure includes a concave-convex surface structure formed on the reflective conductive layer and the transparent conductive layer, and only the second vertical alignment film includes an alignment regulating force defining a pretilt azimuthal direction.

17. The liquid crystal display panel according to claim 12, wherein the light diffusing structure includes a concave-convex surface structure formed on the counter electrode, and only the first vertical alignment film includes an alignment regulating force defining a pretilt azimuthal direction.

18. The liquid crystal display panel according to claim 12, wherein the light diffusing structure includes a light diffusion layer in a transparent resin, the light diffusion layer including dispersed particles of a different refractive index from that of the transparent resin.

19. The liquid crystal display panel according to claim 18, wherein the light diffusion layer is provided between the counter electrode and the second substrate.

20. The liquid crystal display panel according to claim 12, wherein $\Delta n^*dr$ and $\Delta n^*dt$ are each independently within a range of not less than 0.22 μm and not greater than 0.31 μm, and a size of a chiral pitch of the liquid crystal layer is within a range of not less than 9 μm and not greater than 14 μm.

21. The liquid crystal display panel according to claim 12, further comprising:
a TFT connected to each of the plurality of pixels,
wherein the TFT includes an oxide semiconductor layer including an In—Ga—Zn—O-based semiconductor as an active layer.

22. The liquid crystal display panel according to claim 12, further comprising:
memory circuits connected to the plurality of respective pixels.

23. The liquid crystal display panel according to claim 12, further comprising a circular polarizer provided on a lower side of the first substrate and another circular polarizer provided on an upper side of the second substrate.

* * * * *